(12) United States Patent
Maeda et al.

(10) Patent No.: US 6,544,364 B2
(45) Date of Patent: Apr. 8, 2003

(54) ULTRASONIC ADHERING METHOD AND APPARATUS

(75) Inventors: Hideji Maeda, Toyama-ken (JP); Keisuke Iwashita, Toyama-ken (JP); Satoshi Matsumura, Toyama-ken (JP)

(73) Assignee: YKK Corporation, Tokyo (JP)

( * ) Notice: Subject to any disclaimer, the term of this patent is extended or adjusted under 35 U.S.C. 154(b) by 120 days.

(21) Appl. No.: 09/731,763

(22) Filed: Dec. 8, 2000

(65) Prior Publication Data

US 2001/0004913 A1 Jun. 28, 2001

(30) Foreign Application Priority Data

Dec. 24, 1999 (JP) ............................................. 11-366962

(51) Int. Cl.[7] ............................................. B29C 65/08
(52) U.S. Cl. ......................... 156/64; 156/73.1; 156/359; 156/580.1; 156/580.2
(58) Field of Search ............................... 156/64, 73, 1, 156/359, 580.1, 580.2, 308.2

(56) References Cited

U.S. PATENT DOCUMENTS

| | | | |
|---|---|---|---|
| 3,438,428 A | | 4/1969 | Balamuth et al. ............... 165/1 |
| 5,843,253 A | * | 12/1998 | Stivani et al. ................. 156/64 |
| 5,846,377 A | * | 12/1998 | Frantz et al. ................. 156/359 |
| 5,855,706 A | * | 1/1999 | Grewell ........................ 156/64 |
| 6,009,925 A | * | 1/2000 | Hall et al. .................... 156/358 |

FOREIGN PATENT DOCUMENTS

| | | |
|---|---|---|
| DE | 4206584 | 9/1993 |
| EP | 0 960581 | 12/1999 |
| JP | 590 89116 | 5/1984 |
| JP | 59 165622 | 9/1984 |
| JP | 60 000934 | 1/1985 |
| JP | 62 140823 | 6/1987 |
| JP | 63 315223 | 12/1988 |
| JP | 05 299480 | 11/1993 |

OTHER PUBLICATIONS

European Search Report Application EP 00 12 8144 dated Mar. 6, 2002.

* cited by examiner

*Primary Examiner*—James Sells
(74) *Attorney, Agent, or Firm*—Finnegan, Henderson, Farabow, Garrett & Dunner, L.L.P.

(57) ABSTRACT

With the ultrasonic adhering method and apparatus, ultrasonic adhesion can be made appropriately, regardless of external environments and a simple structure. The apparatus includes an ultrasonic oscillator for generating ultrasonic vibration, a horn provided in this ultrasonic oscillator for oscillating ultrasonically, and a temperature sensor for sensing the temperature of the horn. A controlling unit is provided for detecting the temperature of the horn and controlling oscillation time of the ultrasonic oscillator in a state of the horn being contact with an object to be adhered in such a manner that the oscillation time has a negative correlation with respect to the temperature of the horn.

7 Claims, 4 Drawing Sheets

ULTRASONIC ADHERING METHOD AND APPARATUS

BACKGROUND OF THE INVENTION

1. Field of the Invention

The present invention relates to an ultrasonic adhering method of adhering a sheeted resin material by heating and fusing by means of ultrasonic oscillation. It also relates to an apparatus thereof.

2. Description of the Related Art

An adhering apparatus by means of ultrasonic oscillation that has been known hitherto comprises an ultrasonic oscillator for generating ultrasonic vibration, and an ultrasonic oscillation horn provided in the ultrasonic oscillator. It serves to heat and fuse an object by pressing the ultrasonic oscillation horn to a material to be adhered to each other and oscillating it.

A control method in this ultrasonic adhesion includes a method of detecting the horn temperature and controlling amplitude of ultrasonic oscillation of the horn. In this control method, for example, as disclosed in Japanese Patent Publication No. 2-35661 or Japanese Patent Laid-open Publication No. 63-315223, the temperature is detected as reference temperature by a temperature sensing element such as thermistor mounted to a holding member or a receptacle, and the amplitude of ultrasonic oscillation is made to be increased when the temperature is lower than the reference temperature, or decreased when higher.

Further, as disclosed in Japanese Patent Laid-open Publication No. 62-140823 or Japanese Patent Laid-open Publication No. 5-299480, there has been also proposed a control means for detecting temperature of an ultrasonic horn having a heating device such as heater, and controlling the heating device so as to keep the horn at a constant temperature.

In the aforementioned prior art of controlling the amplitude of ultrasonic oscillation, when the amplitude is made to increase in ultrasonic adhesion, local failure may occur in the adhesion material such as a sheeted resin material. This is because sudden energy addition occurs due to increase of amplitude of the ultrasonic oscillation. In the case of a thin-sheeted material, it is likely to be broken locally in its pressed area. Still worse, the condition of inducing local failure is not constant, so that it was difficult to control the limit of energy accurately so as not to induce local failure.

Furthermore, the method of keeping the ultrasonic horn at a constant temperature is applicable in the case of fusing at a relatively high temperature such as welding of metal. In the case of adhesion of resin or the like, on the other hand, the fusion temperature is relatively low, and a heater or any other heating means cannot be provided. To the contrary, since the temperature of the ultrasonic horn rises due to continuous use of ultrasonic adhesion, it is required to suppress the temperature rise. To suppress this temperature rise, however, it is not sufficiently efficient to cool it by air blow, but when a cooling device is installed, the equipment increases and the production cost would rise. In particular, in the ultrasonic adhesion of sheeted resin materials, when the temperature becomes too high, the materials become brittle. Thus, temperature control of the horn has been a serious problem.

The invention is made in the light of the aforementioned problems of the prior art, and it is hence an object thereof to provide an ultrasonic adhering method and apparatus capable of performing appropriate adhesion in a simple construction, regardless of external environments.

SUMMARY OF THE INVENTION

In order to achieve the foregoing object, according to the present invention, there is provided an ultrasonic adhering method for bringing a horn of an ultrasonic oscillator to contact with a sheeted resin material while the sheeted resin material is overlaid on an object to be adhered and oscillating the horn ultrasonically, being characterized in that temperature of the horn is sensed, and the oscillation time in a state of the horn being in contact with the sheeted resin material is set to be in a negative correlation with respect to the temperature of the horn, and the sheeted resin material is fused to the object. The temperature of the horn is sensed immediately before the sheeted resin material is made to adhere by the horn.

The object to be adhered may be fastener tapes having coupling elements of a slide fastener, and the sheeted resin material is reinforcing materials such as reinforcing tapes to be fused to portions of the tapes, i.e. at ends of the fastener tapes, where a bottom stop is to be mounted.

Furthermore, according to the present invention, there is provided an ultrasonic adhering apparatus including an ultrasonic oscillator for generating ultrasonic vibration, a horn provided in this ultrasonic oscillator for oscillating ultrasonically, a temperature sensor for sensing the temperature of the horn, and a controlling unit for detecting the temperature of the horn, and controlling oscillation time of the ultrasonic oscillator in a state of the horn being contact with a sheeted resin material in such a manner that the oscillation time has a negative correlation with respect to the temperature of the horn. The temperature sensor is of non-contact type, which senses the temperature of the horn near the object to be fused.

DESCRIPTION OF THE PREFERRED EMBODIMENT

Figure 1:
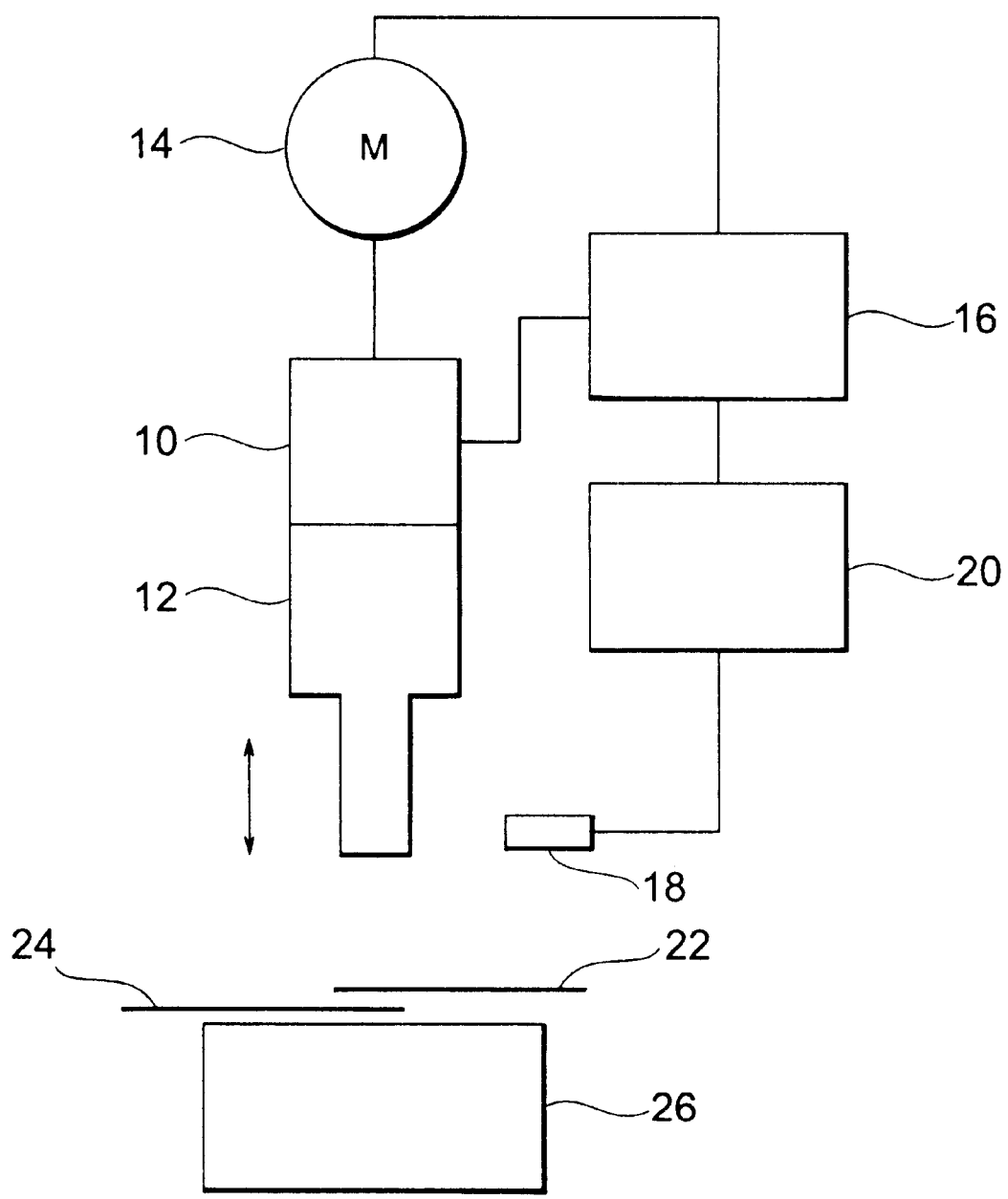
FIG. 1 is a schematic view of an ultrasonic adhering apparatus according to an embodiment of the present invention.

An embodiment of the present invention will be described below with reference to FIG. 1 and FIG. 2. The ultrasonic adhering apparatus of this embodiment comprises, as shown in FIG. 1, an ultrasonic oscillator 10 for generating ultrasonic vibration, and a horn 12 mounted integrally to the ultrasonic oscillator 10 for oscillating ultrasonically. The ultrasonic oscillator 10 and the horn 12 are connected to a drive unit 14 such as motor, and are movable vertically. The ultrasonic oscillator 10 and the drive unit 14 are connected to a controlling unit 16 and controlled by the controlling unit 16, where specific control is carried out as will be described later. A temperature sensor 18 for sensing the temperature of the horn 12 without making contact therewith is provided near a lower end of the horn 12. A detection output of the temperature sensor 18 is put into a temperature detecting device 20 for detecting temperature, and an output of the temperature detecting device 20 is put into the controlling unit 16.

The ultrasonic adhering apparatus of the embodiment serves to fuse thin sheeted resin materials 22 and a sheeted object 24 to be fused, to each other. The sheeted resin materials 22 and the object 24 are placed on an anvil 26 that is a receptacle provided beneath the horn 12, and the edges of the sheeted resin materials 22 and the object 24 are adhered to each other as being held with the horn 12 and the anvil 26.

When adhering the sheeted resin materials 22 and the object 24, the temperature of the horn 12 is set to be low at the beginning of its use, and rises as the horn 12 continues to be used. In ultrasonic adhesion of the sheeted resin materials 22 and the object 24, under a condition that amplitude and frequency of the ultrasonic oscillation are kept to be constant, if the horn temperature is low and the oscillation time in adhesion is short, adhesion strength against twist or the like becomes weak. Under the same condition, if the horn temperature is high and the oscillation time in adhesion is long, the sheeted resin materials are likely to be brittle. Summing up this relation, in region (a) indicated by solid line in FIG. 2, the ultrasonic adhesion is performed appropriately, but in an outside region indicated by broken line where the oscillation time is shorter or the horn temperature is lower than in the region (a), the adhesion strength is insufficient, or where the oscillation time is longer or the horn temperature is higher than in the region (a), the adhesion state is brittle. Therefore, the oscillation time of the ultrasonic oscillator 10 in the state of the horn 12 being in contact with the sheeted resin material 22 is controlled to settle within the range of the region (a) as shown in FIG. 2 by detecting the temperature of the horn 12 and adjusting the oscillation time according to the temperature.

Figure 2:
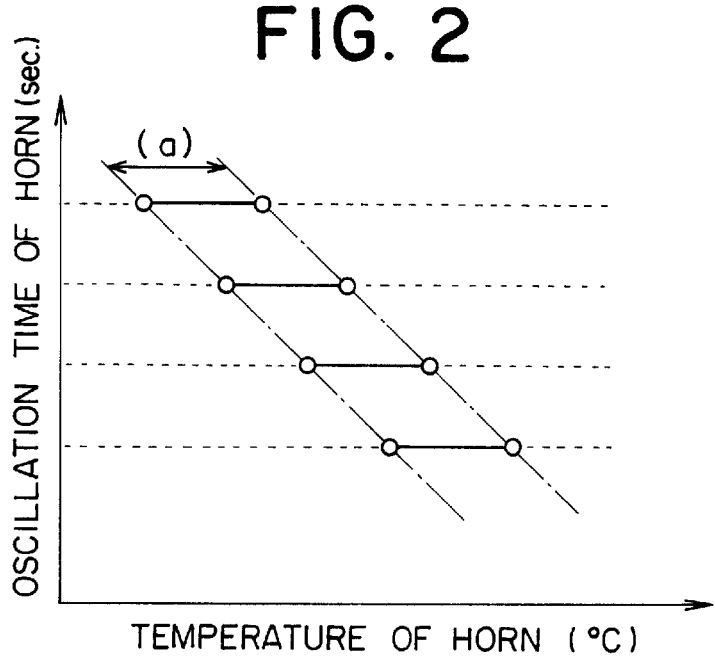
FIG. 2 is a graph showing an appropriate relation between the horn temperature and the horn oscillation time of the ultrasonic adhering apparatus of the embodiment.

As shown in FIG. 2, in an appropriate relation of the horn temperature and the oscillation time, the oscillation time is set in a negative correlation with respect to the horn temperature, which is expressed in the following formula:

$$Y = B - AX$$

where Y is the oscillation time, X is the temperature of the horn 12, A is a positive value expressing an inclination of the region (a), and a coefficient of the above formula for controlling the oscillation time, and B is the oscillation time when the temperature of the horn 12 is supposed to be 0.

Temperature detection of the horn 12 is preferred to be carried out immediately before the adhesion of the sheeted resin materials 22 and the object 24 by the horn 12, according to which more accurate temperature setting is possible and adhesion can be ensured. As the temperature sensor 18, a non-contact type temperature sensor for detecting infrared ray is preferred, and thermopile or semiconductor sensor may be used.

According to the ultrasonic adhering method and apparatus of this embodiment, the temperature of the horn 12 is sense without making contact therewith, and the oscillation time is controlled in such a manner that the relation between the horn temperature and the oscillation time in adhesion are made to be in a condition for favorable adhesion. Therefore, if the horn temperature rises as the horn 12 continues to be used, the adhesion can always be performed in an appropriate condition. Also by controlling the oscillation time, the adhesion state is kept constant. Thus, as compared with control of amplitude of ultrasonic oscillation, sudden energy is not added to the sheeted resin material so that local failure hardly occurs. Furthermore, easy and accurate control is possible because it is a control of the time.

The controlling unit and the temperature detecting device used in the ultrasonic adhering method and apparatus of the present invention may be either composed in separate circuits or exclusive devices. Alternatively, they may be composed integrally with a proper computer system, or may be separated functionally into a temperature detector and a controlling unit. The structure is not particularly specified.

An example of the ultrasonic adhering method and apparatus of the present invention will be described below with reference to FIG. 3 to FIG. 7. This example is designed to adhere reinforcing tapes 34, 35, which are transparent reinforcing members of the sheeted resin materials, to front and back faces of fastener tapes 30, 32 of a slide fastener 40 as shown in FIG. 7. The material for the reinforcing tapes may include polyester elastomer, polyamide elastomer, nylon 6, nylon 12, etc. The fastener tapes 30, 32 are woven or knitted of synthetic fiber such as polyester or nylon, or natural fiber such as cotton.

The ultrasonic adhering apparatus of this example, as explained in the embodiment above, comprises an ultrasonic oscillator 10, and a horn 12 mounted integrally to the ultrasonic oscillator 10 for fusing. The ultrasonic oscillator 10 and the horn 12 are mounted to a drive unit 14 for making ascending and descending motions. A drive unit 28 is also provided in an anvil 26 for receiving the horn 12. This drive unit 28 is also connected to a controlling unit 16 for moving up and down at an opposite side to the horn 12 in cooperation with the ascending and descending motions of the horn 12.

The ultrasonic oscillator 10 and the drive units 14, 28 are connected to the controlling unit 16, where specific ascending and descending motions and ultrasonic oscillation are controlled as will be described later. A detection output of a temperature sensor 18 for sensing the temperature of a leading end of the horn 12 is put into a temperature detecting device 20 for detecting temperature, and an output of the temperature detecting device 20 is put into the controlling unit 16.

Figure 3:
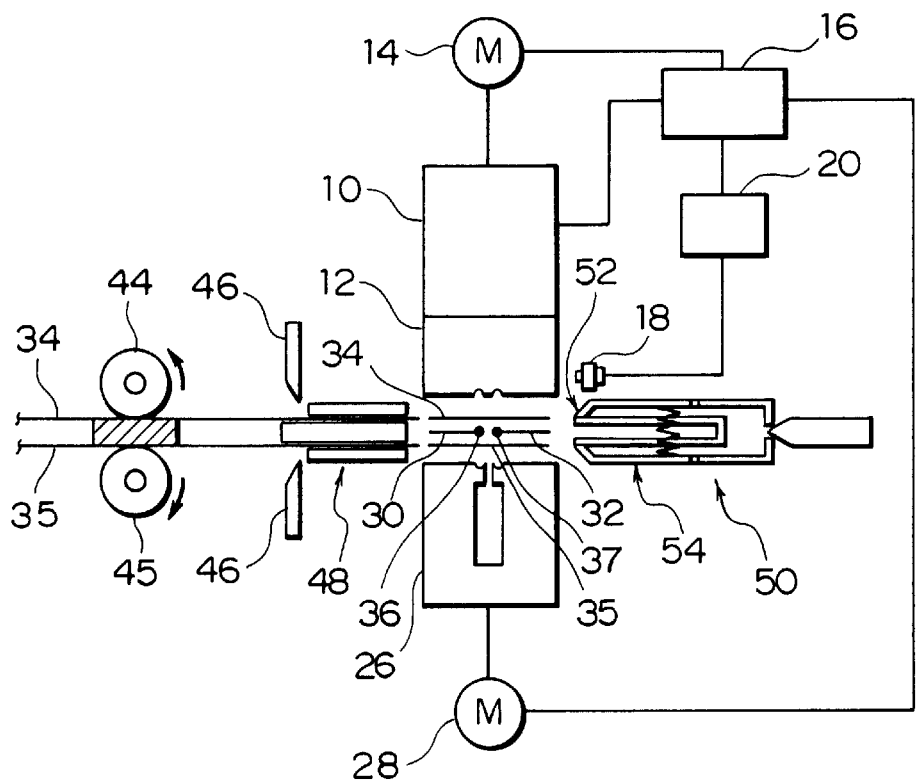
FIG. 3 is a schematic view of an embodiment in which the ultrasonic adhering apparatus of the present invention is used for adhesion of reinforcing tapes of a slide fastener.

By this ultrasonic adhering apparatus, the fastener tapes 30, 32 to which the reinforcing tapes 34, 35 are to be adhered are fed in a vertical direction to a surface of FIG. 3. Spherical cores 36, 37 are provided integrally at mutually adjacent side edges of the fastener tapes 30, 32. The cores 36, 37 are to be provided with coupling elements 38. Without forming cores in the fastener tapes 30, 32, alternatively, the coupling elements 38 may be directly fitted to the fastener tapes 30, 32.

Figure 6:
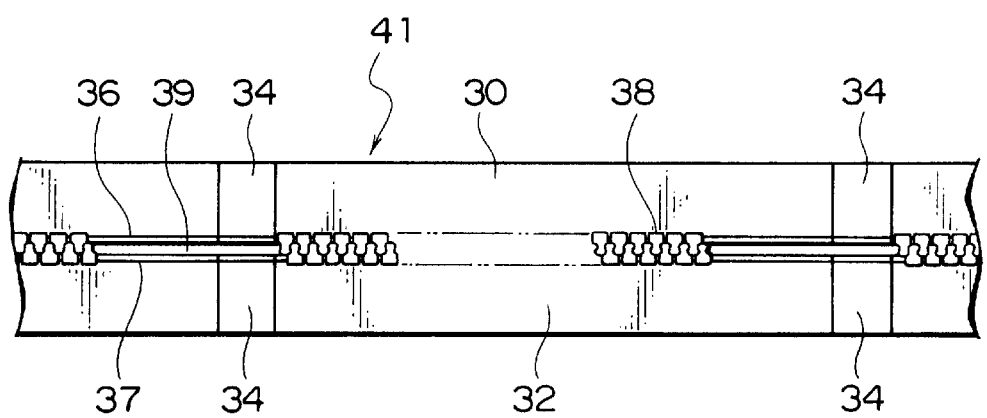
FIG. 6 is a plan of a slide fastener chain having reinforcing tapes adhered thereto by the ultrasonic adhering apparatus of the embodiment.
Figure 7:
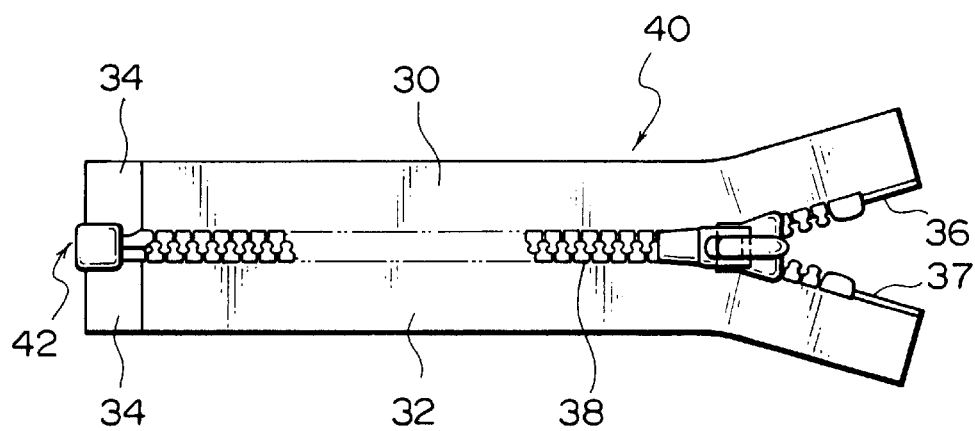
FIG. 7 is a plan of a slide fastener having reinforcing tapes adhered thereto by the ultrasonic adhering apparatus of the embodiment.

The reinforcing tapes 34, 35 are adhered, as shown in FIG. 6, to portions where a bottom stop 42 of the fastener tapes 30, 32 is to be mounted, i.e. ends of rows of the coupling elements 38 of a slide fastener chain 41 mounted along the cores 36, 37 of the pair of fastener tapes 30, 32. Then, the slide fastener chain 41 is cut off at a space 39 where no coupling elements 38 exist, and the bottom stop 42 is attached to the surfaces of the reinforcing tapes 34, 35 as shown in FIG. 7.

As shown in FIG. 3, a feeder feeds reinforcing tapes 34, 35 in parallel to each other and at a right angle to the fastener tapes 30, 32. The reinforcing tapes 34, 35 are fed to the fastener tapes 30, 32 intermittently by feed rollers 44, 45. Between the horn 12 and the feed rollers 44, 45, a cutter 46 is provided for cutting the reinforcing tapes 34, 35 into substantially the same width as the fastener tapes 30, 32, and a holder 48 for temporarily holding the reinforcing tapes 34, 35 cut in that specified width is provided between the horn 12 and the cutter 46.

On an opposite side of the holder 48 across the horn 12, there is a gripping device 50 for pulling out the cut-off reinforcing tapes 34, 35 into a space between the horn 12 and the anvil 26. The gripping device 50 has two pairs of holding portions 52, 54, and the cut-off reinforcing tapes 34, 35 are held between each pair of holding portions 52, 54 and then pulled out of the holder 48.

Figure 4:
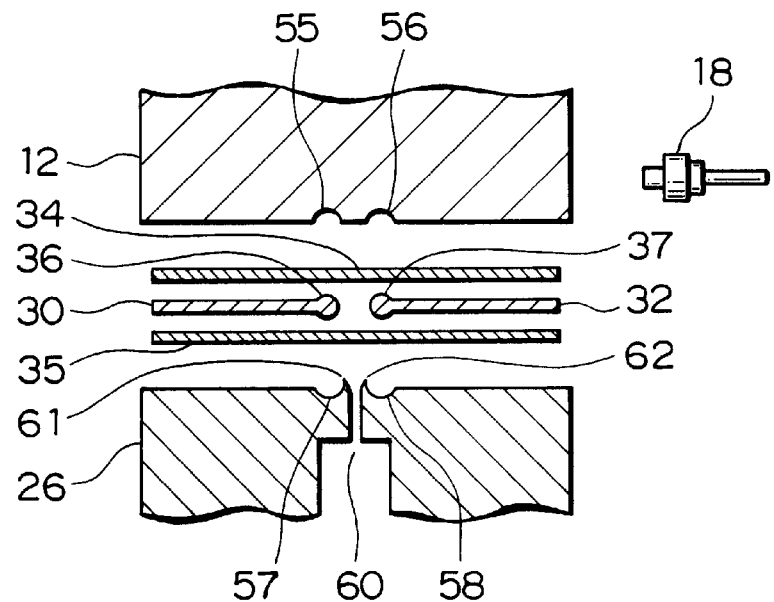
FIG. 4 is a longitudinal sectional view of a horn area when the reinforcing tapes of the slide fastener are adhered by the ultrasonic adhering apparatus of the embodiment.

The horn 12 in this example has, as shown in FIG. 4, semicircular recesses 55, 56 formed at portions corresponding to the cores 36, 37 of the fastener tapes 30, 32. Each of the semicircular recesses 55, 56 has a diameter substantially equal to that of each of the cores 36, 37. Similarly, the anvil 26 has semicircular recesses 57, 58 formed at the portions corresponding to the cores 36, 37, and each of the semicircular recesses 57, 58 has a diameter substantially equal to that of each of the cores 36, 37. A space 60 is formed between the recesses 57, 58 of the anvil 26, and mutually adjacent edges of the recesses 57, 58 are formed as cutting edges 61, 62, by which the reinforcing tapes 34, 35 are cut off as being held against the edges of the recesses 55, 56 of the horn 12.

In operation of the ultrasonic adhering apparatus of the example, the fastener tapes 30, 32 are fed between the horn 12 and the anvil 26. When the portions of the tapes where the reinforcing tapes 34, 35 are to be fused, which are one-side ends of the coupling elements 38, come to the position between the horn 12 and anvil 26, the fastener tapes 30, 32 stop. Then, the reinforcing tapes 34, 35 are pulled out to the reinforcing tape mounting portions on the front and back faces of the fastener tapes 30, 32. For pulling out the reinforcing tapes 34, 35, the reinforcing tapes 34, 35 fed into the holder 48 by the feed rollers 44, 45 are respectively cut into a width of each of the fastener tapes 30, 32 by the cutter 46, and the cut-off reinforcing tapes 34, 35 as being held by the holder 48 are pulled out to the front and back faces of the fastener tapes 30, 32 by the gripping device 50. The gripping device 50 moves back and forth so that the fastener tapes 30, 32 can be positioned between the two pairs of the holding portions. 52, 54. Thus, the fastener tapes 30, 32 may not interfere motion of the reinforcing tapes 34, 35 or the gripping device 50.

Figure 5:
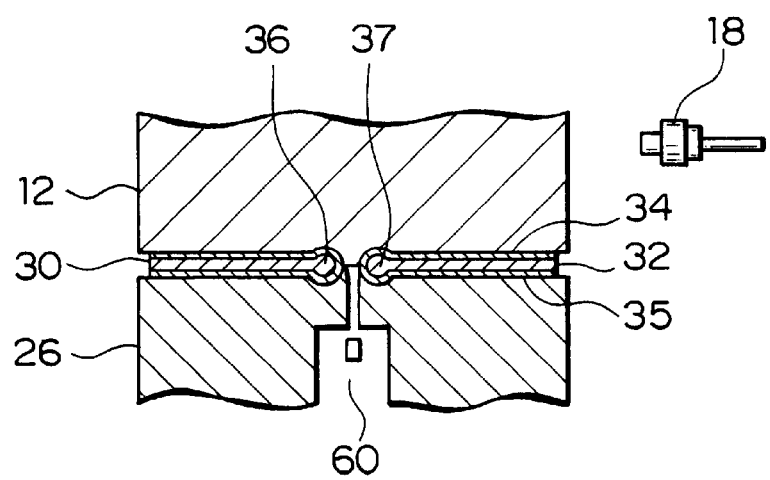
FIG. 5 is a longitudinal sectional view of a horn area in a state where the reinforcing tapes of the slide fastener are adhered by the ultrasonic adhering apparatus of the embodiment.

Afterwards, the horn 12 and the anvil 26 move to each other, and pinch and press the fastener tapes 30, 32 and the reinforcing tapes 34, 35. At this time, as shown in FIG. 5, the reinforcing tapes 34, 35 are wound around the cores 36, 37 of the fastener tapes 30, 32 by the recesses 55, 56 of the horn 12 and the recesses 57, 58 of the anvil 26, and extra portions of the reinforcing tapes 34, 35 between the cores 36, 37 are cut off by the cutting edges 61, 62, and fall into the space 60.

While the fastener tapes 30, 32 and the reinforcing tapes 34, 35 are held by the horn 12 and the anvil 26, the ultrasonic oscillator 10 generates ultrasonic vibration, so that the ultrasonic oscillation is generated in the horn 12. Immediately before the horn 12 descends, the temperature of the leading end of the horn 12 is sensed by the temperature sensor 18 through the temperature detecting device 20, and the oscillation time of the ultrasonic oscillation of the ultrasonic oscillator 10 is set by the controlling unit 16. As mentioned above, the oscillation time is set according to the formula having a negative correlation with respect to the temperature of the horn 12. When the adhesion of the reinforcing tapes 34, 35 is completed, the fastener tapes 30, 32 are fed by the length of one slide fastener 40. Then, the next reinforcing tape adhering portions of the fastener tapes come to the space between the horn 12 and the anvil 26, whereby the adhesion as described above is similarly repeated.

As the reinforcing tapes 34, 35 of the fastener tapes 30, 32 are adhered by the ultrasonic adhering apparatus of this example, the temperature of the horn 12 is low at the beginning of the operation. Therefore, even though the temperature of the horn 12 rises after the continuous operation, the adhesion can be performed in an optimum adhesion condition throughout the process. Even if the ambient temperature varies depending on the time or season, the adhesion state of the reinforcing tapes 34, 35 does not fluctuate. In particular, by sensing the temperature of the horn 12 immediately before the adhesion operation, the adhesion can be carried out in a more accurate condition. Besides, since the temperature sensor 18 is of non-contact type, the temperature of the horn 12 can be sensed without being affected by the ultrasonic oscillation, so that the adhesion in optimum condition is possible to achieve, including the ambient temperature around the horn 12.

The ultrasonic adhering method and apparatus of the present invention should not be limited to the illustrated embodiment or example alone, but the objects to be adhered can be properly selected. Furthermore, the horn and the temperature sensor can also be properly selected. The horn temperature and the oscillation time of the ultrasonic oscillation are not required to be in linear relation as far as they are in a mutually negative correlation.

According to the ultrasonic adhering method and apparatus of the present invention, since the oscillation time of the ultrasonic oscillation is controlled by sensing the horn temperature, an appropriate ultrasonic adhesion can be realized while the energy per unit time is kept at a relatively low value. In particular, accurate adhesion can be realized without causing defective adhesion or brittleness in fusion of the sheeted resin materials. Furthermore, since the control of the oscillation time is relatively easy, more accurate control is possible.

Further, according to the present invention, since the oscillation time of the ultrasonic oscillation is set depending on the temperature of the horn 12 immediately before adhesion of sheeted resin materials, more accurate adhering operation is possible while keeping a stable quality.

By using the non-contact type temperature sensor, the horn temperature can be sensed including its ambient temperature. Therefore, the time of the ultrasonic adhesion can be set in consideration of external. Therefore, more accurate and stable adhesion can be realized.

Still further, by applying this ultrasonic adhering method and apparatus to adhesion of reinforcing members of a slide fastener, the reinforcing tapes can be adhered stably with a higher adhering strength.

What is claimed:

1. An ultrasonic adhering method for bringing a horn of an ultrasonic oscillator in contact with a sheeted resin material while the sheeted resin material is overlaid on an object to be adhered and oscillating the horn ultrasonically, wherein a temperature of the horn is sensed, and an oscillation time in a state of the horn being in contact with the sheeted resin material is set to be in a negative correlation with respect to the temperature of the horn, wherein the negative correlation is expressed by the following formula:

$$Y=B-AX$$

wherein Y is the oscillation time, X is the temperature of the horn, A is a positive value expressing an inclination and a coefficient of the formula for controlling the oscillation time, and B is the oscillation time when the temperature X of the horn is 0, and wherein the sheeted resin material is fused to the object by controlling the oscillation time Y at the temperature X of the horn being in contact with the sheeted resin material.

2. The ultrasonic adhering method according to claim 1, wherein the temperature of the horn is sensed immediately before the sheeted resin material is adhered by the horn.

3. The ultrasonic adhering method according to claim 1 or 2, wherein said object to be adhered is fastener tapes having coupling elements of a slide fastener, and the sheeted resin material is reinforcing materials to be fused to mounting portions of a bottom stop at ends of the fastener tapes.

4. An ultrasonic adhering apparatus including an ultrasonic oscillator for generating ultrasonic vibration, a horn provided in this ultrasonic oscillator for oscillating ultrasonically, a temperature sensor for sensing a temperature of the horn, and a controlling unit for detecting the temperature of the horn and controlling an oscillation time of the ultrasonic oscillator in a state of the horn being in contact with a sheeted resin material in such a manner that the oscillation time has a negative correlation with respect to the temperature of the horn, wherein the negative correlation is expressed by the following formula:

$$Y=B-AX$$

wherein Y is the oscillation time, X is the temperature of the horn, A is a positive value expressing an inclination and a coefficient of the formula for controlling the oscillation time, and B is the oscillation time when the temperature X of the horn is 0, and wherein the controlling unit controls the oscillation time Y at the temperature X of the horn being in contact with the sheeted resin material.

5. The ultrasonic adhering apparatus according to claim 4, wherein said temperature sensor is of non-contact type.

6. An ultrasonic adhering method according to claim 1, wherein said temperature X of the horn has a predetermined range of permissible temperature, and said oscillation time Y is controlled within said range of permissible temperature.

7. An ultrasonic adhering apparatus according to claim 4, wherein said temperature X of the horn has a predetermined range of permissible temperature, and said controlling unit controls said oscillation time Y within said range of permissible temperature.

* * * * *